Patented Feb. 24, 1953

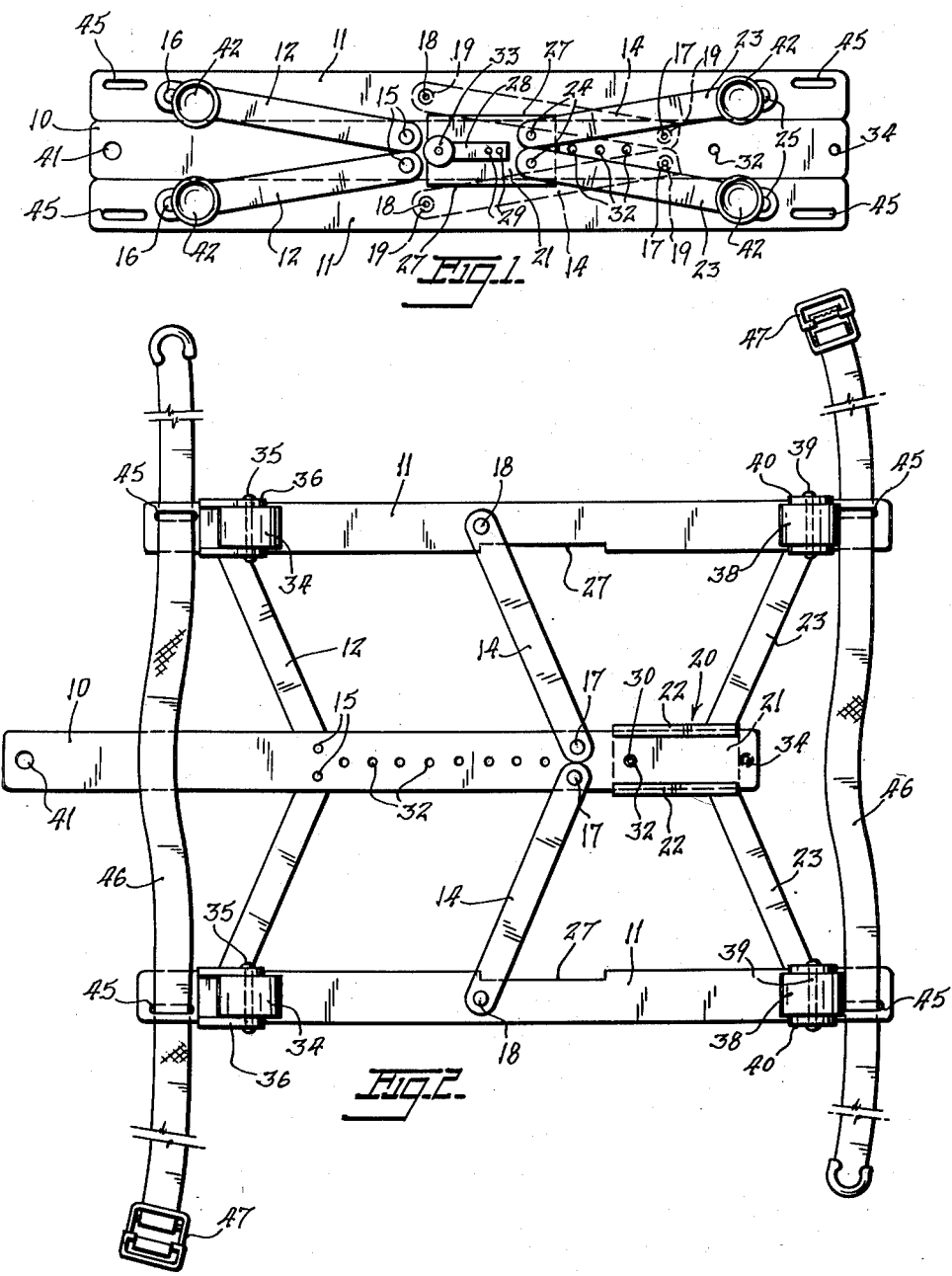

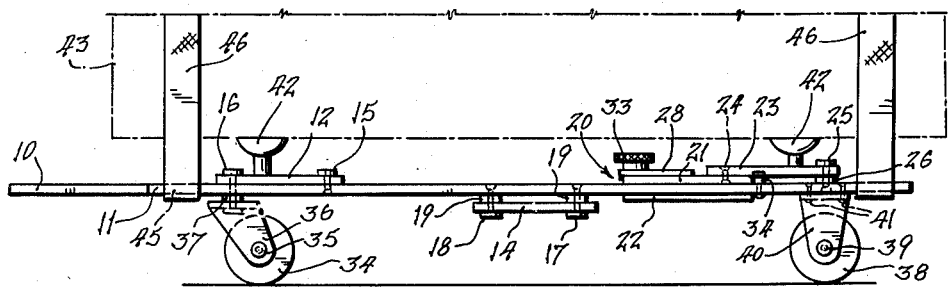
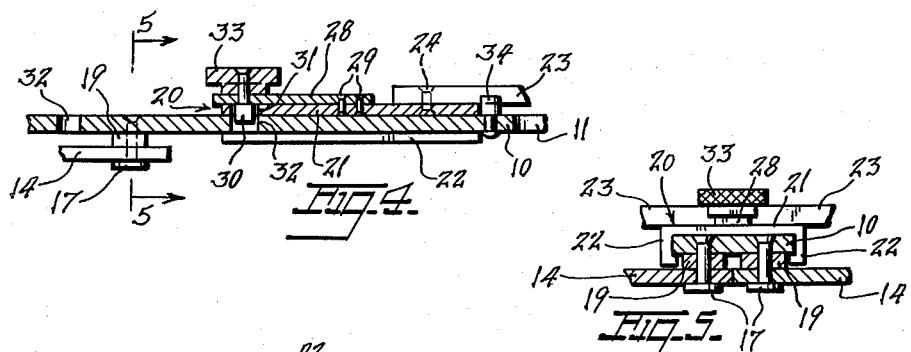
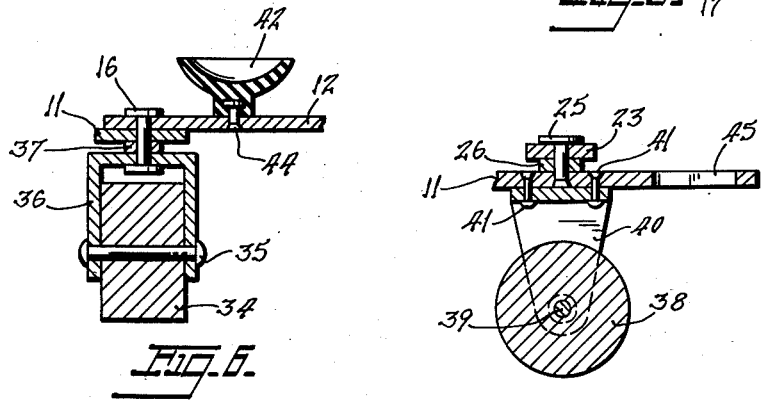

2,629,607

UNITED STATES PATENT OFFICE 2,629,607

ADJUSTABLE LUGGAGE CARRIER

Albert Roubeck, New York, N. Y.

Application February 27, 1952, Serial No. 273,609

6 Claims. (Cl. 280—35)

This invention relates to a new collapsible wheeled luggage carrier.

More specifically, the present invention proposes the construction of a novel luggage carrier which can be easily adjusted to the desired width and removably attached to suitcases, satchels and other articles of heavy luggage for convenient movement along railroad station platforms, through car aisles and elsewhere at railroad and other public conveyance terminals making it a convenient matter for a traveller to handle his own luggage when a porter is not available or when it is not desired to engage a porter, also to make it convenient to be used by delivery boys, delivering packages of various types and weights.

The luggage carrier of the present invention is further characterized by the fact that it is light in weight and readily collapsible into such small bulk that it can be carried as easily as a collapsible ladies' umbrella, but which, at the same time, is readily adjusted to the desired width to provide a skeletal wheeled carrier to take pieces of luggage of various sizes; the maximum degree of expansion providing such a carrier large and strong enough to support the average trunk.

Still further, the present invention proposes characterizing the luggage carrier by an elongated central bar with side bars extended along opposite sides of the central bar and pivotally connected thereto by means which causes the side bars to move parallelly away from and toward the central bar in a manner so that a piece of luggage may be rested thereon after having been adjusted to the width of the piece of luggage to be carried thereon.

Another object of the present invention proposes the provision of a means on the central bar for moving the side bars relative to the central bar and for locking the side bars in the desired adjusted positions.

As a further object, the present invention proposes providing the side bars with straps by which the luggage may be fixedly mounted in position on the carrier and with wheels on the bottom face thereof by which the carrier with the luggage mounted thereon may be rolled to its destination.

It is a further object of the present invention to provide a collapsible wheeled luggage carrier which is simple and durable, which is effective for its intended purposes and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

On the accompanying drawing forming a material part of the present disclosure:

Fig. 1 is a top plan view of the wheeled carrier of the present invention in its fully collapsed position and with the luggage attaching belts removed.

Fig. 2 is a bottom elevational view of the carrier in its fully extended position and with the luggage attaching belts in position thereon.

Fig. 3 is a side elevational view of the carrier in its fully extended operative position and with a piece of luggage, shown in dot and dash lines, mounted in position thereon.

Fig. 4 is an enlarged longitudinal sectional view taken through the adjustment member in the fully extended position of the carrier.

Fig. 5 is a partial transverse sectional view taken on the line 5—5 of Fig. 4.

Fig. 6 is an enlarged sectional view taken through one of the turnably mounted front wheels of the carrier.

Fig. 7 is an enlarged sectional view taken through one of the fixedly mounted rear wheels of the carrier.

The collapsible wheeled luggage carrier, according to the present invention, is constructed, except where specifically otherwise indicated, entirely of metallic strips cut and shaped as required. The metal chosen should preferably be of a non-corrosive type so that the carrier will be rust free thus maintaining a neat appearance for a long time notwithstanding that the carrier might be subjected to wet and otherwise unfavorable weather conditions while being used for its intended purposes.

The luggage carrier includes an elongated central bar 10 and side bars 11 extended parallelly along the two sides of the central bar. Means is provided for always maintaining the side bars 11 in parallel spaced positions relative to the central bar 10 for adjusting the width of the carrier to the desired width of the piece of luggage to be carried thereon. The means for maintaining the spaced positions of the side bars 11 includes spaced pairs of links 12 and 14. The links 12 are extended along the top faces of the bars 10 and 11 and have their inner ends pivotally connected to the central bar 10 intermediate of its ends by means of pivot rivets 15. The outer ends of the links 12 are connected to the side bars 11 closely adjacent their front ends by means of pivot rivets 16, see Figs. 1, 3 and 6. The links 14 are extended along the bottom faces of the bars 10 and 11 and have their inner ends pivotally connected to the central bar 10, rearward of the pivoted ends of the links 12, by means of pivot rivets 17. Likewise, the outer ends of the links 14 are pivotally attached to the side bars 11 by means of pivot rivets 18.

The spacing between the pivot rivets 15 and 17 and the pivot rivets 16 and 18 is the same so that the links 12 and 14 extend parallel to one another in all adjusted positions of the side bars 11 relative to the central bar 10. Thus, it is apparent that each of the side bars 11 with its respective links 12 and 14 and the central bar 10 form parallelogram structures for insuring parallel movement of the side bars 11 relative to the central bar 10.

The ends of the links 14 are spaced from the bottom faces of the central bar 10 and the side bars 11 by means of washers 19 positioned on the pivot rivets 17 and 18 between the adjacent faces of the central bar 10, the side bars 11 and the ends of the links 14. The reason for this spacing will become clear as this description proceeds.

Means is provided for moving the side bars 11 relative to the central bar for adjusting the width of the carrier and for holding the side bars in the desired adjusted positions. The moving and holding means is characterized by an adjustment member 20 slidably mounted on the rear end portion of the central bar 10. The adjustment member 20 consists of a flat plate 21 positioned on the top face of the central bar 10 and which has side edge flanges 22, see particularly Figs. 4 and 5, bent into position beneath the bottom face of the central bar 10. The free edges of the flanges 22 are spaced so that the adjustment member may have freedom of sliding movement forward and rearward on the central bar 10 past the attached inner ends of the links 14. The washers 19 on the pivot rivets 17 at the inner ends of the links 14 space those inner ends of the links a sufficient distance from the bottom face of the central bar 10 to permit the flanges 22 to pass thereby.

Connected between the rear end of the top plate 21 of the adjustment member and the rear ends of the side bars 11, there are links 23. The inner ends of the links 23 are attached to the top face of the rear end of the plate 21 by means of pivot rivets 24. The outer ends of the links 23 are attached to the rear ends of the side bars 11 by means of pivot rivets 25. To compensate for the thickness of the material of the top plate 21 of the adjustment member 20 and to maintain the links 23 level, washers 26, see particularly Fig. 7, are mounted on the rivets 25 between the adjacent faces of the side bars 11 and the links 23. The washers 26 are of the same thickness as the material of the plate 21 of the adjustment member 20.

The links 23 are diverged in a direction opposite to the direction of divergence of the links 12 and 14, so that as the adjustment member 20 is moved to various adjusted positions along the length of the central bar 10, the side bars 11 will be moved parallelly away from the central bar 10 to the desired adjusted position. The sides of the side bars 11 which face the central bar 10 are formed with cutouts 27, see Figs. 1 and 2. The cutouts 27 are of a length corresponding to the length of the adjustment member 20 and are so located as to provide clearance for the adjustment member when the side bars 11 are collapsed completely against the sides of the central bar 10, as shown in Fig. 1.

Means is provided for holding the adjustment member 20 in the desired adjusted position along the length of the central bar 10 for holding the side bars 11 in the desired adjusted position relative to the central bar 10. The holding means comprises an elongated leaf spring 28 extended along the top face of the plate 21 of the adjustment member 20 and secured thereto at one end by spaced rivets 29, see Fig. 4. The free end of the leaf spring 28 carries a pin 30 which depends through a complementary hole 31 formed in the top plate 21. The bottom end of the pin 30 is selectively engageable with complementary apertures 32 formed along the length of the central bar 10. The hole 31 and the apertures 32 are of a size to provide sufficient clearance so that when the free end of the leaf spring 28 is raised the bottom end of the pin 30 will be raised out of the respective aperture 32 freeing the adjustment member 20 to be moved along the length of the central bar 10 to align the pin 30 with another aperture 32. As best shown in Figs. 1 and 2, the apertures are spaced further apart as they approach the rear end of the central bar 10 because the angular disposition of the links 12, 14 and 23 requires a greater movement of the adjustment member 20 as it approaches the free rear end of the central bar to obtain the same movement of the side bars 11 relative to the central bar 10 than when it is inward of the free rear end of the central bar. Thus, movement of the pin 30 from one aperture 32 to the next, regardless of the position of the adjustment member 20 on the central bar 10 will provide the same degree of movement of the side bars 11 away from the central bar 10.

To permit the free end of the leaf spring 28 to be conveniently raised to disengage its bottom end from the aperture 32, the pin 30 extends above the top face of the leaf spring and is provided with an enlarged flattened knob 33. A stop pin 34 is extended upward from the rear end of the central bar 10 to be engaged by the adjustment member 20 retaining it from being slipped completely off the rear end of the central bar 10.

The front ends of the side bars 11 are provided at their bottom faces with wheels 34 rotatively carried by axles 35 supported between the bottom ends of inverted U-shaped brackets 36. The brackets 36 are supported at their tops on the pivot rivets 16 to turn on the vertical axes of those rivets 16 to make the front wheels 34 dirigible so that the luggage carrier may be steered. To reduce the frictional contact between the bottom faces of the side bars 11 and the brackets 36, so that the front wheel assemblies turn more freely on the axis of the rivets 16, washers 37 are interposed between the adjacent faces of the side bars 11 and the brackets 36. Similarly, the rear ends of the side bars 11 are provided with wheels 38. The wheels 38 are rotatively mounted on axles 39 supported between the bottom ends of inverted U-shaped brackets 40. The brackets 40 are fixedly secured to the bottom faces of the side bars 11, at the rear ends thereof, by means of rivets 41. The rivets 41, see Fig. 7, are located on opposite sides of the pivot rivets 25 that attach the outer ends of the links 23 to the rear ends of the side bars 11.

The pivotal mounting of the front wheel assemblies to turn on the vertical axes of the pivot rivets 16 makes the carrier completely dirigible to be steered around corners or the like. The front end of the central bar 10 is provided with a hole 41 to which one end of a rope, strap or the like, not shown, can be attached for pulling the luggage carrier with the luggage mounted thereon. Alternatively, the carrier and luggage mounted thereon can be propelled to roll on the wheels 34 and 38 using the handle of the luggage mounted on the carrier.

Mounted on the top faces of the links 12 and 23 closely adjacent their outer ends, there are upwardly faced suction cups 42. The suction cups 42 are formed of rubber or other compressible material to have a piece of luggage, as indicated by the dot and dash lines 43 in Fig. 3, rested thereon. The suction cups 42 are formed with shanks 44, see Fig. 6 extended through complementary holes formed in the links 12 and 23 and which are milled over at the bottom faces of the links mounting the suction cups in position. The suction cups 42 function to hold the piece of luggage 43 from shifting relative to the carrier and also raise the bottom face of the piece of luggage above the parts of the carrier exposed at the top thereof.

The front and rear ends of the side bars 11 are formed with elongated slots 45 through which belts 46 are removably laced. The belts 46 are formed of cloth webbing material and each is provided at one end with a buckle 47, see Fig. 2. The ends of the belts 46 are arranged to be extended upward about the piece of luggage 43 and be joined together using the buckles 47 so as to hold the piece of luggage 43 fixedly in position on the carrier.

In the collapsed condition of the carrier, shown in Fig. 1, the ends of the belts 46 can be wound about the bars 10 and 11. The slidable extension of the belts 46 through the slots 45 does not interfere with the adjustment of the side bars 11 relative to the central bar 10.

The manner of using the carrier is as follows:

First, the width of the carrier is adjusted using the adjustment member 20, as previously described, to the width of the particular piece of luggage to be carried on the carrier. The adjusted carrier is then placed on the ground to rest on its wheels 34 and 38. The piece of luggage is then placed on the carrier to rest on the suction cups 42, as shown by the dot and dash lines 43 in Fig. 3. The piece of luggage is then strapped in position on the carrier using the belts 46 so that the piece of luggage can be easily manipulated by a traveller without having to call on a porter or in such cases when porters are not available.

The carrier is removed from the piece of luggage by reversing the above procedure after which the carrier may again be collapsed to the position shown in Fig. 1 reducing its overall size to be conveniently carried or stored between uses. It is appreciated, that a convenient carrying case can be provided into which the collapsed carrier can be inserted between uses, without departing from the scope and intent of the present invention.

While I have illustrated and described the preferred embodiment of my invention, it is to be understood that I do not limit myself to the precise construction herein disclosed and the right is reserved to all changes and modifications coming within the scope of the invention as set forth in the appended claims.

Having thus described my invention, what I claim as new and desire to secure by United States Letters Patent is:

1. A collapsible luggage carrier comprising an elongated central bar, side bars extended along the sides of said central bar and extended parallel thereto, wheels on the ends of said side bars, links pivotally connected at their ends between said central bar and said side bars so that said side bars can be moved parallelly away from and toward said central bar, an adjustment member slidably mounted on said central bar to move longitudinally thereof, links pivotally connected between said side bars and said adjustment member for moving said side bars away from and toward said central bar as said adjustment member is moved along the length of said central bar, and means holding said adjustment member in desired shifted positions along the length of said central bar, said adjustment member comprising a top plate mounted on the top face of said central bar, and flanges extended from the side of said top plate and bent about the longitudinal side edges of said central bar for slidably supporting said top plate to move longitudinally relative to said central bar.

2. A collapsible luggage carrier comprising an elongated central bar, side bars extended along the sides of said central bar and extended parallel thereto, wheels on the ends of said side bars, links pivotally connected at their ends between said central bar and said side bars so that said side bars can be moved parallelly away from and toward said central bar, an adjustment member slidably mounted on said central bar to move longitudinally thereof, links pivotally connected between said side bars and said adjustment member for moving said side bars away from and toward said central bar as said adjustment member is moved along the length of said central bar, and means holding said adjustment member in desired shifted positions along the length of said central bar, said adjustment member comprising a top plate mounted on the top face of said central bar, and flanges extended from the side of said top plate and bent about the longitudinal side edges of said central bar for slidably supporting said top plate to move longitudinally relative to said central bar, said holding means comprising a leaf spring extended along the top face of the top plate of said adjustment member, said leaf spring being secured at one end to said top plate, and a pin depended from the free end of said leaf spring through a complementary hole formed in said top plate, said central bar having spaced apertures along its length for selective engagement by said pin for securing said adjustment member in the desired adjusted position along the length of said central bar.

3. A collapsible luggage carrier comprising an elongated central bar, side bars extended along the sides of said central bar and extended parallel thereto, wheels on the ends of said side bars, links pivotally connected at their ends between said central bar and said side bars so that said side bars can be moved parallelly away from and toward said central bar, an adjustment member slidably mounted on said central bar to move longitudinally thereof, links pivotally connected between said side bars and said adjustment member for moving said side bars away from and toward said central bar as said adjustment member is moved along the length of said central bar, and means holding said adjustment member in desired shifted positions along the length of said central bar, said adjustment member comprising a top plate mounted on the top face of said central bar, and flanges extended from the side of said top plate and bent about the longitudinal side edges of said central bar for slidably supporting said top plate to move longitudinally relative to said central bar, said holding means comprising a leaf spring extended along the top face of the top plate of said adjustment member, said leaf spring being secured at one end to said top plate, and a pin depended from the free end of said leaf spring through a complementary hole formed in said top plate, said central bar having spaced apertures along its length for selective engagement by said pin for securing said adjustment member in the desired adjusted position along the length of said central bar, said apertures being progressively further spaced from one another toward the end of said central bar so that as said pin is moved from one aperture to the other the spacing of said side bars from said central bar will be in steps of the same distance.

4. A collapsible luggage carrier comprising an elongated central bar, side bars extended along the sides of said central bar and extended parallel thereto, wheels on the ends of said side bars, links pivotally connected at their ends between said central bar and said side bars so that said side bars can be moved parallelly away from and toward said central bar, an adjustment member slidably mounted on said central bar to move longitudinally thereof, links pivotally connected between said side bars and said adjustment member for moving said side bars away from and toward said central bar as said adjustment member is moved along the length of said central bar, and means holding said adjustment member in desired shifted positions along the length of said central bar, and suction cups mounted on the ends of said last-mentioned links and certain of said first-mentioned links for having a piece of luggage rested thereon.

5. A collapsible luggage carrier comprising an elongated central bar, side bars extended along the sides of said central bar and extended parallel thereto, wheels on the ends of said side bars, links pivotally connected at their ends between said central bar and said side bars so that said side bars can be moved parallelly away from and toward said central bar, an adjustment member slidably mounted on said central bar to move longitudinally thereof, links pivotally connected between said side bars and said adjustment member for moving said side bars away from and toward said central bar as said adjustment member is moved along the length of said central bar, and means holding said adjustment member in desired shifted positions along the length of said central bar, and suction cups mounted on the ends of said last-mentioned links and certain of said first-mentioned links for having a piece of luggage rested thereon, said side bars having elongated slots adjacent their ends, and belts extended through said slots to be engaged about the piece of luggage to retain it in position on said suction cups.

6. A collapsible luggage carrier comprising an elongated central bar, side bars extended along the sides of said central bar and extended parallel thereto, wheels on the ends of said side bars, links pivotally connected at their ends between said central bar and said side bars so that said side bars can be moved parallelly away from and toward said central bar, an adjustment member slidably mounted on said central bar to move longitudinally thereof, links pivotally connected between said side bars and said adjustment member for moving said side bars away from and toward said central bar as said adjustment member is moved along the length of said central bar, and means holding said adjustment member in desired shifted positions along the length of said central bar, said adjustment member comprising a top plate mounted on the top face of said central bar, and flanges extended from the side of said top plate and bent about the longitudinal side edges of said central bar for slidably supporting said top plate to move longitudinally relative to said central bar, said holding means comprising a leaf spring extended along the top face of the top plate of said adjustment member, said leaf spring being secured at one end to said top plate, and a pin depended from the free end of said leaf spring through a complementary hole formed in said top plate, said central bar having spaced apertures along its length for selective engagement by said pin for securing said adjustment member in the desired adjusted position along the length of said central bar, and a stop pin extended upward from the end of said central bar toward which said adjustment member is moved to space said side bars from said central bar to retain the adjustment member from being slipped completely off that end of said central bar.

ALBERT ROUBECK.

REFERENCES CITED

The following references are of record in the file of this patent:

UNITED STATES PATENTS

| Number | Name | Date |
| --- | --- | --- |
| 2,534,986 | Ossbahr et al. | Dec. 19, 1950 |